United States Patent Office 3,133,077
Patented May 12, 1964

3,133,077
2-PYRIDYL-ALKYLAMINES AND THEIR LOWER ALKANOYL AMIDES
Andor Fürst and Arthur Boller, Basel, Switzerland, assignors to Hoffmann-La Roche Inc., Nutley, N.J., a corporation of New Jersey
No Drawing. Filed Mar. 7, 1962, Ser. No. 177,981
Claims priority, application Switzerland Mar. 30, 1961
15 Claims. (Cl. 260—295)

This invention relates to novel pyridine compounds and methods for their preparation. More particularly the novel pyridine compounds of the invention are 2-pyridyl-alkylamine compounds selected from the group consisting of compounds of the formula

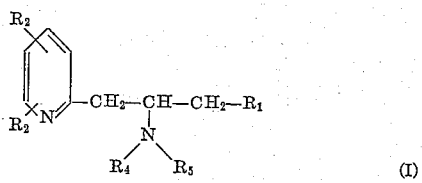

(I)

acid addition salts thereof, quaternary salts thereof and N-oxides thereof.

In Formula I above, $R_1$ is selected from the group consisting of hydrogen and methyl; $R_2$ is lower alkyl, such as methyl, ethyl, propyl, isopropyl and the like; $R_3$ is selected from the group consisting of hydrogen and lower alkyl, such as methyl, ethyl, propyl, isopropyl, and the like; $R_4$ is selected from the group consisting of hydrogen, lower alkyl, such as methyl, ethyl, propyl, isopropyl, butyl, and the like, aralkyl such as phenyl lower alkyl as, for example, benzyl and the like, haloalkyl such as bromo- and chloroalkyl, particularly halo-lower alkyl such as $\beta$-chloro-ethyl and acyl such as lower alkanoyl, preferably acetyl; and $R_5$ is selected from the group consisting of lower alkyl, such as methyl, ethyl, propyl, isopropyl, butyl, and the like, aralkyl such as phenyl lower alkyl as, for example, benzyl, hydroxyalkyl, for example, hydroxy-lower alkyl, such as $\beta$-hydroxy-ethyl, and haloalkyl, such as bromo- and chloroalkyl, especially halo-lower alkyl, such as $\beta$-chloro-ethyl.

The process of the invention comprises reductively aminating a ketone of the formula

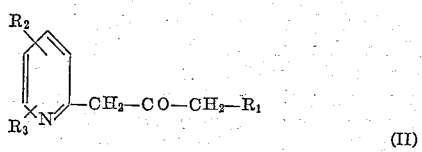

(II)

wherein $R_1$, $R_2$, and $R_3$ have the same meaning as above, with an amino compound of the formula

(III)

wherein $R_4'$ is selected from the group consisting of hydrogen, lower alkyl and aralkyl, and $R_5'$ is selected from the group consisting of hydrogen, lower alkyl, aralkyl and hydroxyalkyl.

In the case where there is obtained a primary amine, i.e., when $R_4'$ and $R_5'$ both represent hydrogen, an aralkyl, lower alkyl, hydroxyalkyl or haloalkyl group can be subsequently introduced as a substituent in the amino group, i.e., on the aliphatic nitrogen atom. In the case where a secondary amine is obtained, i.e. when one of $R_4'$ and $R_5'$ is hydrogen, a lower alkyl, aralkyl, hydroxyalkyl, haloalkyl or acyl group can be subsequently introduced as a substituent in the amino group. A reaction product of Formula I above can, if desired, be converted into an acid addition salt or quaternary salt or can be oxidized to its corresponding pyridine-N-oxide.

Acid addition salts can be prepared in the usual way by treatment of the obtained secondary or tertiary amines. Pharmaceutically acceptable acid addition salts can thus be prepared from conventional pharmaceutically acceptable acids, for example, there can be used inorganic acids such as hydrochloric acid, sulfuric acid, phosphoric acid, nitric acid, and the like, or organic acids, such as acetic acid, propionic acid, oxalic acid, tartaric acid, citric acid, methane sulfonic acid, and the like.

Conventional quaternizing agents are suitable for the conversion of the reaction product into quaternary salts. Thus, pharmaceutically acceptable quaternary ammonium salts can be formed with conventional pharmaceutically acceptable quaternizing agents, for example, lower alkyl- and aralkyl-, halides and sulfates, such as methyl chloride, ethyl bromide, benzyl chloride, dialkyl sulfate, toluene sulfonates, and the like.

Compounds of Formula I contain two basic nitrogen atoms. Accordingly, they form acid addition salts with one or two molecules of acid and form both mono- and di-quaternary salts.

The reaction products of Formula I contain an asymmetric carbon atom. They are accordingly obtained in the form of a racemic mixture, which can be separated into the optical antipodes by methods known per se.

According to a preferred embodiment of the method of the invention, catalytically activated hydrogen is employed as the reducing agent for the reductive amination of the starting material ketone. As catalytic agents for this purpose, there suitably can be used Raney nickel or Raney cobalt. However, other hydrogenation catalysts, such as platinum catalysts, can also successfully be used.

Of special interest for the catalytic-reductive amination procedure, as amines of Formula III, are ammonia and primary amines. So as to avoid unwanted side reactions, these amine compounds are preferably used in excess; for example, in up to about a ten-fold excess. The hydrogenation is suitably effected at an elevated temperature, for example, at about 100–130° C., and under pressure, advantageously of about 100–180 atmospheres pressure. Suitable solvents are, for example, methanol or ethanol. Suitably, the hydrogenation mixture is vigorously agitated until the calculated amount of hydrogen is absorbed, which as a rule takes at the most fifteen hours. Accordingly, the hydrogenation is advantageously conducted in a rocking autoclave.

According to a further embodiment of the method of the invention the reductive amination of the starting material ketone can be conducted in the manner of a Leuckart-Wallach reaction (cf. Organic Reactions 5 [1949], 301) by employing formic acid as the reducing agent. In this embodiment there can also be employed as starting materials the formly and formate derivatives of amine compounds of Formula III above. Via the reaction of such primary and secondary amines there are obtained N-formyl derivatives as products. In these cases in order to obtain the free amine, the reaction product must be hydrolyzed. In this procedure the amine component is suitably employed in excess. It has been found suitable to conduct the amination at a temperature of about 140–180° C., preferably at about 150–175° C. The use of special solvents is unnecessary in this procedure, since the reaction components, for example, formamide, can themselves serve this purpose.

When ammonia is employed as the amine compound of Formula III, the product of the reductive amination is a primary amine. According to one method of the invention there is introduced into this amino group a lower alkyl, hydroxyalkyl, or haloalkyl substituent whereby a secondary amine is obtained. The introduction of these groups can be effected by methods known per se. For example, for the introduction of a β-hydroxyethyl group, the primary amine formed by the principal reaction can be reacted with ethylene oxide. The hydroxy group of the soformed β-hydroxyethylamine can easily be replaced by a halogen atom, and thereby the corresponding β-halo derivative can be obtained.

Secondary amine end-products of Formula I so-obtained by further N-substitution of primary amines, or also directly via reductive amination using a primary amine starting material, can, if desired, be substituted by a further lower alkyl, hydroxyalkyl, haloalkyl or also an acyl group, by methods known per se, whereby tertiary amines or N-acyl derivatives of secondary amines are obtained. Tertiary amines also, according to the present invention, can be directly obtained, by using a secondary amine as the starting material amino compound of Formula III and formic acid as the reducing agent.

The starting material ketones of Formula II above which are not already known compounds can be obtained according to known methods. Especially preferred starting material ketones are 2-(β-oxo-propyl or butyl)-4,5 or 6-lower alkyl-pyridines and 2-(β-oxo-propyl or butyl)-4,6-dilower alkyl-pyridine.

The 2-pyridyl-alkylamino compounds obtained according to the invention are appetite depressants. They are particulary advantageous in that they exert little or no effect on the central nervous system. In part they also have activity as anti-inflammatory agents. Exemplary of those compounds possessing this latter activity is 1-(5-methyl - 2 - pyridyl) - 2 - [N-methyl-N-(β-chloroethyl)-amino]-propane.

As especially active compounds of the invention, the following reaction products can be noted as exemplary:

1-(5-ethyl-2-pyridyl)-2-methylamino-propane and its salts; such as, for example, its dihydrochloride;
1-(4-methyl-2-pyridyl)-2-methylamino-propane and its salts;
1 - (5 - ethyl - 2-pyridyl)-2-[N-methyl-N-(β-chloroethyl)-amino]-propane and its salts; and
1 - (5-methyl-2-pyridyl)-2-[N-methyl-N-(β-chloroethyl)-amino]-propane and its salts.

The novel compounds of the invention can be administered in the form of conventional pharmaceutical preparations; for example, the compounds of Formula I above, their pharmaceutically acceptable acid addition salts, their pharmaceutically acceptable quaternary ammonium salts, or their pyridine-N-oxides can be administered in mixture with pharmaceutical, organic or inorganic inert carrier materials suitable for enteral or parenteral administration; containing, for example, water, gelatin, lactose, starch, magnesium stearate, talc, vegetable oils, gums, polyalkyleneglycols, Vaseline, or the like. The pharmaceutical preparations can be in conventional solid forms, for example, tablets, suppositories, dragees, capsules, or the like, or in conventional liquid forms, for example, solutions, suspensions, emulsions, or the like. If desired, the pharmaceutical preparations can be submitted to conventional pharmaceutical processes such as sterilization and the like; and can contain conventional pharmaceutical assistants, such as preservatives, stabilizers, emulsifiers, wetting agents, buffers, salts for the adjustment of osmotic pressure, and the like. They also can contain other therapeutically active materials.

The following examples are illustrative but not limitative of the invention. All temperatures are in degrees centrigrade.

Example 1

(a) 293 g. of 1-(5-methyl-2-pyridyl)-2-propanone was heated for 1½ hours at 115° in a nitrogen atmosphere in a rocking autoclave with 500 ml. of methanol, 40 g. of Raney nickel, and 400 g. of pure liquid ammonia, and then agitated for fifteen hours at 105–115° under 180 atmospheres of hydrogen. The hydrogenated solution was then concentrated in vacuo at 40° until all of the ammonia was removed. The residue was diluted with 1500 ml. of ether, and the resulting solution dried with solid potassium carbonate. The ether was then evaporated, and the so-obtained oily residue distilled in vacuo, yielding 170 g. of 1-(5-methyl-2-pyridyl)-2-amino-propane, boiling at 106–109°/13 mm., $n_D=1.5159$. The dihydrochloride, after crystallization from ethanol-ethyl acetate, melted at 218–219°.

(b) 24.6 g. of 1-(5-methyl-2-pyridyl)-2-amino-propane was heated in a bomb tube at 50–55° for 48 hours with 7.0 g. of condensed ethylene oxide and 5 ml. of methanol. The brown-violet reaction product was then subjected to fractional distillation in vacuo yielding 16.6 g. of 1-(5-methyl - 2 - pyridyl) - 2-(β-hydroxy-ethylamino)-propane boiling at 162–165°/12 mm., $n_D=1.5228$.

(c) 16.6 g. of 1-(5-methyl-2-pyridyl)-2-(β-hydroxyethylamino)-propane was converted into its dihydrochloride with excess ethanolic hydrochloric acid. After the removal of the excess hydrochloric acid and solvent in vacuo, the oily residue was mixed with 150 ml. of carbon tetrachloride and 80 ml. of thionyl chloride, and the heterogeneous reaction mixture heated for two hours with light reflux. The excess thionyl chloride and the carbon tetrachloride were then removed in vacuo and the residue subjected to dissolution and subsequent evaporation in vacuo, twice with chloroform and once with ethanol. The so-obtained brown-black residue was then dissolved in ethanol and mixed with ethyl acetate until the first signs of turbidity, whereupon the solution was cooled to 0° yielding 13.9 g. of the dihydrochloride of 1-(5-methyl-2-pyridyl)-2-(β-chloro-ethylamino)-propane, melting at 179–180°.

The 1-(5-methyl-2-pyridyl)-2-propanone employed as the starting material above can be obtained as follows:

To a flask equipped with a condenser, thermometer, dropping funnel, and stirrer, 131 g. of magnesium shavings, 884 ml. of absolute benzene and 4.5 ml. of bromine were added. There was then added thereto with stirring a mixture of 592 g. of ethyl bromide and 448 ml. of absolute ether, the addition being conducted so that the temperature remained between 60 and 70°. Then there was added, while keeping the temperature below 70°, a mixture of 474 g. of 2,5-dimethyl-pyridine and 884 ml. of absolute toluene. The reaction mixture was then heated to 85° for 100 hours with stirring, cooled to 0° and mixed dropwise with 426 g. of ethyl acetate. The mixture was then heated to 80° for 1 hour, again cooled to 0°, and then a solution of 580 g. of ammonium chloride in 2900 ml. of water added dropwise. The resulting solution was extracted with ether, and the ether extract dried and concentrated. The residue was distilled in vacuo, yielding 293 g. of 1-(5-methyl-2-pyridyl)-2-propanone in a purity of about 70 percent, boiling point 115–140°/13 mm., besides 85 g. of unconverted 2,5-dimethyl-pyridine.

Example 2

(a) 293 g. of 1-(5-methyl-2-pyridyl)-2-propanone was heated in a nitrogen atmosphere to 115° for 1½ hours in a rocking autoclave with 500 ml. ethanol, 40 g. of Raney nickel, and 500 g. of pure methylamine and then was agitated for 15 hours at 105–115° under 180 atmospheres of hydrogen. The hydrogenation solution was then concentrated in vacuo at 40° until all of the methylamine was removed. The residue was diluted with 1500 ml. of ether and the solution dried with solid potassium carbonate. Following evaporation of the ether, the oily residue was distilled in vacuo yielding 230 g. of 1-(5-methyl-2-pyridyl)-2-methylamino-propane, boiling at 112–116°/12 mm., $n_D=1.5100$. The dihydrochloride, upon crystallization from ethanol-ethyl acetate, melted at 175–176°.

(b) By reaction according to the process of Example 1b of 24.6 g. of 1-(5-methyl-2-pyridyl)-2-methylamino-propane with 0.7 g. of ethylene oxide there was obtained, besides 4.6 g. of starting material, 22.3 g. of 1-(5-methyl-2-pyridyl)-2-[N-methyl-N-(β-hydroxy-ethyl)-amino]-propane, boiling at 163–166°/13 mm., $n_D$=1.5200.

(c) By the method set forth in Example 1c, there was obtained from 12.0 g. of 1-(5-methyl-2-pyridyl)-2-[N-methyl-N-(β-hydroxy-ethyl)-amino]-propane first its dihydrochloride, and then, upon reaction of the latter with 200 ml. of carbon tetrachloride and 100 ml. of thionyl chloride, 13.1 g. of the dihydrochloride of 1-(5-methyl-2-pyridyl) - 2 - [N - methyl - N - (β - chloro - ethyl) - amino]-propane, melting at 171–172°.

(d) By hydrogenation of 1-(5-methyl-2-pyridyl)-2-methylamino-propane in mixture with 37 percent formaldehyde solution (1.1 moles of formaldehyde per mole of the base) in the presence of palladium-carbon and ethanol, there is obtained, after separation of the catalyst material and evaporation of the solvents, 1-(5-methyl-2-pyridyl)-2-dimethylamino-propane, which boiled at 123–124°/15 mm., $n_D$=1.5027. The dihydrochloride, upon crystallization from methanol-ethyl acetate, melted at 181–182°.

Example 3

(a) By catalytic-reductive amination according to the method of Example 1a there was obtained from 115 g. of 1-(4-methyl-2-pyridyl)-2-propanone, with 300 ml. of methanol, 30 g. of Raney nickel, and 200 g. of pure liquid ammonia, 78 g. of 1-(4-methyl-2-pyridyl)-2-amino-propane, boiling at 114–118°/16 mm., $n_D$=1.5158. The dihydrochloride, upon crystallization from ethanol-ethyl acetate, melted at 198–199°.

(b) 1-(4-methyl-2-pyridyl)-2-amino-propane could also be prepared as follows: a mixture of 325 g. of formamide, 217 g. of 98 percent formic acid and 87 g. of 1-(4-methyl-2-pyridyl)-2-propanone was heated to 170° for 40 hours and then refluxed with 2 liters of 20 percent hydrochloric acid for 20 hours. The solution was then concentrated to dryness in vacuo, the excess hydrochloric acid removed by twice dissolving the residue in 150 ml. of water and then evaporating, the resulting residue dissolved in 300 ml. of water and mixed, while cooling, with an excess of concentrated sodium hydroxide. The solution was then extracted three times with ether, the ether extracts dried with solid potassium carbonate, the ether evaporated in vacuo and the residue distilled, yielding 1-(4-methyl-2-pyridyl)-2-amino-propane.

(c) By the method set forth in Example 1b there was obtained from 21.2 g. of 1-(4-methyl-2-pyridyl)-2-amino-propane and 5.8 g. of ethylene oxide, besides 6.9 g. of starting material, 15.8 g. of 1-(4-methyl-2-pyridyl)-2-(β-hydroxy-ethylamino)-propane boiling at 165–160°/13 mm., $n_D$=1.5261.

(d) By the method set forth in Example 1c there was obtained from 15.8 g. of 1-(4-methyl-2-pyridyl)-2-(β-hydroxy-ethylamino)-propane first its dihydrochloride, and then by reacting it with 100 ml. of carbon tetrachloride and 60 ml. of thionyl chloride, 16.2 g. of the dihydrochloride of 1-(4-methyl-2-pyridyl) - 2 - (β-chloro - ethylamino)-propane, melting at 180–181°.

The 1-(4-methyl-2-pyridyl)-2-propanone employed as the starting material above can be prepared as follows: 60 g. of lithium shavings and 1600 ml. of absolute ether were added to a flask equipped with condenser, gas inlet tube, and stirrer. With stirring, and the introduction of nitrogen, a mixture of 688 g. of bromobenzene and 800 ml. of absolute ether was added thereto. The resulting mixture was then stirred for a further 16 hours. 321 g. of 2,4-dimethyl-pyridine was then added over a period of 20 minutes, following which a mixture of 336 g. of ethyl acetate and 400 ml. of ether was then added. After 30 minutes 1280 ml. of water were added dropwise, and the reaction mixture worked up as described in Example 1. From the distillation, there was obtained 103 g. of unconverted 2,4-dimethyl-pyridine and, as the higher boiling fraction, which boiled at 127–132° (15 mm.), 195 g. of 1-(4-methyl-2-pyridyl)-2-propanone in a purity of at least 70 percent.

Example 4

A mixture of 310 g. of N-methyl-formamide, 75 g. of 98 percent formic acid and 44 g. of 1-(4-methyl-2-pyridyl)-2-propanone was heated at 170° for 40 hours and then refluxed for 16 hours with 1.1 liters of 20 percent hydrochloric acid. The resulting solution was then concentrated in vacuo to dryness, the excess hydrochloric acid removed by twice dissolving the residue in 100 ml. of water and evaporating, the resulting residue dissolved in 200 ml. of water and with cooling mixed with excess concentrated sodium hydroxide. The solution was then extracted three times with ether, the ether extracts dried with solid potassium carbonate, the ether evaporated in vacuo, and the residue distilled, yielding 1-(4-methyl-2-pyridyl)-2-methylamino-propane boiling at 115–118°/15 mm., $n_D$=1.5122. The dihydrobromide, upon crystallization from ethanol-ethyl acetate, melted at 179–180°.

Example 5

By reaction according to the procedure of Example 4 of 280 g. of N-methyl-formamide and 105 g. of 98 percent formic acid with 44 g. of 1-(6-methyl-2-pyridyl)-2-propanone, there was obtained 1-(6-methyl-2-pyridyl)-2-methylamino-propane, boiling at 101–103°/14 mm., $n_D$=1.5092. The dihydrobromide, upon crystallization from ethanol-ethyl acetate, melted at 155–156°.

Example 6

(a) By catalytic-reductive amination according to the procedure of Example 1a of 198.2 g. of 1-(5-ethyl-2-pyridyl)-2-propanone with 350 ml. of methanol, 30 g. of Raney nickel and 300 g. of pure ammonia, there was obtained 1-(5-ethyl-2-pyridyl) - 2 - amino-propane, boiling at 121–124°/13 mm., $n_D$=1.5184. The dihydrobromide, upon crystallization from methanol-ethyl acetate, melted at 200–202°.

(b) By the method set forth in Example 1b there was obtained from 25 g. of 1-(5-ethyl-2-pyridyl)-2-amino-propane and 6.7 g. of ethylene oxide, besides 9.4 g. of unconverted starting material, 16.3 g. of 1-(5-ethyl-2-pyridyl) - 2 - (β-hydroxy-ethylamino)-propane, boiling at 173–178°/14 mm. $n_D$=1.5222.

Example 7

(a) By the process set forth in Example 2a, there was obtained by reaction of 96 g. of 1-(5-ethyl-2-pyridyl)-2-propanone with 400 ml. of methanol, 50 g. of Raney nickel and 180 g. of pure methylamine, 1-(5-ethyl-2-pyridyl)-2-methyl-amino-propane, boiling at 123–126°/13 mm., $n_D$=1.5070.

(b) By reaction according to the procedure of Example 1b of 15.0 g. of 1-(5-ethyl-2-pyridyl)-2-methylamino-propane with 4.2 g. of ethylene oxide there was obtained, besides 6.4 g. of starting material, 8.2 g. of 1(5-ethyl-2-pyridyl)-2-[N-methyl-N-(β-hydroxy - ethyl) - amino]-propane, boiling at 165–169°/13 mm. $n_D$=1.5203. The dihydrochloride melted at 161–162°.

(c) 7.8 g. of the dihydrochloride of 1-(5-ethyl-2-pyridyl)-2-[N-methyl-N-(β-hydroxy - ethyl) - amino]-propane was reacted according to the procedure of Example 1c with 70 ml. of carbon tetrachloride and 45 ml. of thionyl chloride yielding the dihydrochloride of 1-(5-ethyl-2-pyridyl)-2-[N - methyl - N - (β - chloro-ethyl)-amino]-propane, melting at 173–174°.

(d) 42.5 g. of 1-(5-ethyl-2-pyridyl) - 2 - methylamino-propane was slowly added with cooling to 120 g. of acetic acid. The mixture was then mixed with 122 g. of acetic anhydride and refluxed for one hour. After that the reaction mixture was decomposed with one liter of ice water, followed by the addition with cooling of excess concentrated sodium hydroxide, whereupon an oil precipitated. The so-obtained product was extracted three times with ether, dried over solid potassium carbonate, the ether evaporated and the residue distilled in vacuo, yielding 45.8 g. of 1-(5-ethyl-2-pyridyl)-2-(N-acetyl-N-methylamino)-propane; boiling at 172–175°/5 mm., $n_D$=1.5159.

(e) 10.0 g. of 1-(5-ethyl-2-pyridyl)-2-(N-acetyl-N-methylamino)-propane was dissolved in 50 ml. of methanol and, after the addition of 7.1 g. of methyl iodide, refluxed for 6 hours. The reaction mixture was then concentrated in vacuo and mixed with 50 ml. of acetone. The solution was then permitted to stand at 0°, whereupon there precipitated 12.5 g. of 1-(5-ethyl-2-pyridyl)-2-(N-acetyl-N-methylamino)-propane methyl iodide, melting at 143–144°.

(f) 25.8 g. of 1-(5-ethyl-2-pyridyl)-2-(N-acetyl-N-methylamino)-propane was mixed with cooling with 61.2 ml. of acetic acid and, following the addition of 22.2 ml. of 30 percent hydrogen peroxide, kept at 80° for 16 hours. The reaction mixture was then concentrated in vacuo to dryness, mixed with ethanolic hydrochloric acid and permitted to stand for 10 hours at 20°, then again concentrated to dryness, dissolved in water, and mixed with an excess of concentrated sodium hydroxide. The so-obtained product was extracted three times with ethyl acetate, dried with potassium carbonate, the solvents removed in vacuo and the residue distilled in a high vacuum, yielding 11.2 g. of 1-(5-ethyl-2-pyridyl-N-oxide)-2-methylamino-propane, boiling at 127–131°/0.05 mm. $n_D$=1.5508. The dihydrochloride, upon crystallization from ethanol-ethyl acetate, melted at 133–134°.

Example 8

(a) 500 g. of a 30 percent aqueous methylamine solution was slowly mixed with cooling with 600 g. of 98 percent formic acid. The solution was then heated at 140° until all of the water had been evaporated and the residue then heated at 170–180° for 40 hours with 78.4 g. of 1-(5-ethyl-2-pyridyl)-2-propanone, and the resulting residue refluxed for 16 hours with 1300 ml. of 20 percent hydrochloric acid. The resulting solution was then concentrated to dryness in vacuo, the excess hydrochloric acid removed by twice dissolving the residue in 150 ml. of water followed by evaporation, the resulting residue dissolved in 300 ml. of water and with cooling mixed with an excess of concentrated sodium hydroxide, whereupon an oil precipitated. The solution was extracted three times with ether, the ether extracts dried with potassium carbonate, the ether evaporated and the residue distilled in vacuo, yielding 33 g. of 1-(5-ethyl-2-pyridyl)-2-methylamino-propane, boiling at 124–127°/14 mm., $n_D$=1.5067. The dihydrochloride was hygroscopic and upon crystallization from ethanol-ethyl acetate, melted at 151–152°.

(b) By the procedure of Example 2-d there was obtained from 1-(5-ethyl-2-pyridyl)-2-methylamino-propane, 1 - (5 - ethyl - 2 - pyridyl)-2-methylamino-propane, which boiled at 139–140°/20 mm., $n_D$=1.5066. The dihydrochloride melted at 193–194°.

Example 9

(a) According to the process described in Example 1a, 209 g. of 1-(5-ethyl-2-pyridyl)-2-butanone was treated with hydrogen in the presence of 350 ml. of methanol, 30 g. of Raney nickel, and 350 g. of pure ammonia, yielding 138 g. of 1-(5-ethyl-2-pyridyl)-2-amino-butane, boiling at 130–132°/13 mm., $n_D$=1.5111. The dihydrochloride, upon crystallization from ethanol-ethyl acetate, melted at 208–209°.

(b) From 26.7 g. of 1-(5-ethyl-2-pyridyl)-2-amino-butane and 7.0 g. of ethylene oxide, there was obtained according to the procedure of Example 1b, besides 17.6 g. of starting material, 10.2 g. of 1-(5-ethyl-2-pyridyl)-2-(β-hydroxy-ethylamino)-butane boiling at 175–180°/10 mm., $n_D$=1.5191.

(c) By the procedure of Example 1c there was obtained from 1-(5-ethyl-2-pyridyl)-2-(β-hydroxy-ethylamino)-butane, the dihydrochloride of 1-(5-ethyl-2-pyridyl)-2-(β-chloro-ethylamino)-butane, melting at 129–130°.

The 1-(5-ethyl-2-pyridyl)-2-butanone employed as the starting material above can be prepared from 2-methyl-5-ethyl-pyridine, ethyl magnesium bromide and ethyl propionate according to the process given in Example 1.

Example 10

(a) Via catalytic-reductive amination with methylamine according to the procedure of Example 2a, 209 g. of 1-(5-ethyl-2-pyridyl)-2-butanone was converted into 134 g. of 1-(5-ethyl-2-pyridyl)-2-methylamino-butane; boiling at 135–137°/12 mm., $n_D$=1.5057. The dihydrochloride, upon recrystallization from ethanol-ethyl acetate, melted at 173–175°.

(b) 1-(5 - ethyl - 2-pyridyl)-2-methylamino-butane was converted according to the procedure of Example 1b, into 1-(5-ethyl-2-pyridyl) - 2-[N-methyl-N-(β-hydroxy-ethyl)-amino]-butane, boiling at 148–151°/0.18 mm., $n_D$=1.5125.

(c) The hydroxy group of the so-obtained 1-(5-ethyl-2-pyridyl)-2-[N-methyl - N-(β-hydroxy-ethyl)-amino]-butane was replaced according to the procedure of Example 1c by a chlorine atom. The so-obtained dihydrochloride of 1-(5-ethyl-2-pyridyl)-2-[N-methyl-N-(β-chloro-ethyl)-amino]-butane melted at 152–153°.

Example 11

(a) By the procedure set forth in Example 1a, there was obtained by reaction of 210 g. of 1-(4,6-dimethyl-2-pyridyl)-2-propanone with 350 ml. of methanol, 30 g. of Raney nickel and 300 g. of pure ammonia, 157 g. of 1-(4,6-dimethyl-2-pyridyl)-2-amino-propane, boiling at 111–114°/14 mm., $n_D$=1.5129. The dihydrochloride, upon crystallization from alcohol-ethyl acetate, melted at 209–210°.

(b) 1-(4,6-dimethyl-2-pyridyl)-2-amino-propane was converted according to the procedure of Example 1b into 1-(4,6-dimethyl - 2-pyridyl) - 2-(β-hydroxy-ethylamino)-propane, which boiled at 161–164°/14 mm., $n_D$=1.5200.

Example 12

(a) By the procedure of Example 2a, there was obtained by reaction of 209 g. of 1-(4,6-dimethyl-2-pyridyl)-2-propanone with 300 ml. of methanol, 30 g. of Raney nickel and 300 g. of pure methylamine, 165 g. of 1-(4,6-dimethyl-2-pyridyl)-2-methyl-amino-propane, boiling at 109–111°/12 mm., $n_D$=1.5109.

(b) The so-obtained 1-(4,6-dimethyl-2-pyridyl)-2-methylamino-propane was converted according to the procedure of Example 1b into 1-(4,6-dimethyl-2-pyridyl)-2-[N-methyl - N - (β-hydroxy-ethyl)-amino]-propane, which boiled at 152–155°/14 mm., $n_D$=1.5142.

(c) From 9.1 g. of 1-(4,6-dimethyl-2-pyridyl)-2-[N-methyl-N-(β-hydroxy-ethyl)-amino]-propane there was obtained, according to the procedure of Example 1c, 8.4 g. of the dihydrochloride of 1-(4,6-dimethyl-2-pyridyl)-2-[N-methyl-(β-chloro-ethyl)-amino]-propane, melting at 175–176°.

(d) By the procedure of Example 2d, there was obtained from 1-(4,6-dimethyl-2-pyridyl)-2-methylamino-propane, 1-(4,6-dimethyl-2-pyridyl) - 2 - dimethylamino-propane, which boiled at 123–126°/17 mm., $n_D$=1.5005. The dipicrate melted at 155–156°. The above-obtained 1-(4,6-dimethyl-2-pyridyl)-2-dimethylamino-propane was quaternized with excess methyl iodide in acetone yielding the corresponding mono-methyl iodide, which began to melt at 170° turning brown.

Example 13

By reacting 1-(5-ethyl-2-pyridyl)-2-propanone with benzylamine according to the procedure of Example 8a there was obtained 1-(5-ethyl-2-pyridyl)-2-benzylamino-propane, which boiled at 143–152°/0.3 mm., $n_D$=1.5594. The dihydrochloride, upon crystallization from ethanol-ethyl acetate-petroleum ether, melted at 178–179°.

We claim:

1. A compound selected from the group consisting of compounds of the formulae

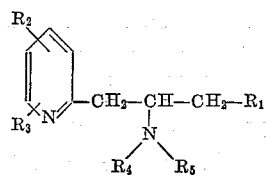

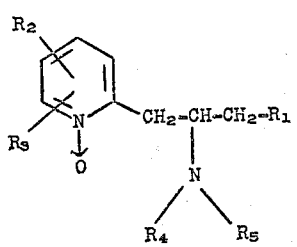

wherein $R_1$ is selected from the group consisting of hydrogen and methyl; $R_2$ is lower alkyl; $R_3$ is selected from the group consisting of hydrogen and lower alkyl; $R_4$ is selected from the group consisting of hydrogen, lower alkyl, ar-lower alkyl, halo-lower alkyl, and lower alkanoyl; and $R_5$ is selected from the group consisting of lower alkyl, ar-lower alkyl, hydroxy-lower alkyl, and halo-lower alkyl; pharmaceutically acceptable acid addition salts thereof, pharmaceutically acceptable quaternary ammonium salts thereof.

2. A compound of the formula

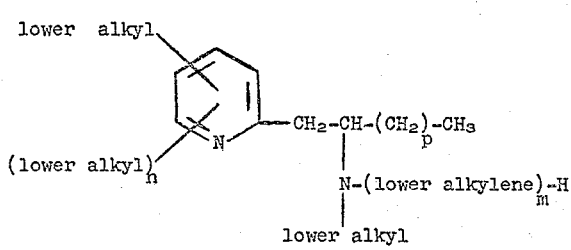

wherein $n$, $m$ and $p$ are each selected from the group consisting of 0 and 1.

3. 1-(4-methyl-2-pyridyl)-2-methylamino-propane.
4. 1-(5-ethyl-2-pyridyl)-2-methylamino-propane.
5. A compound of the formula

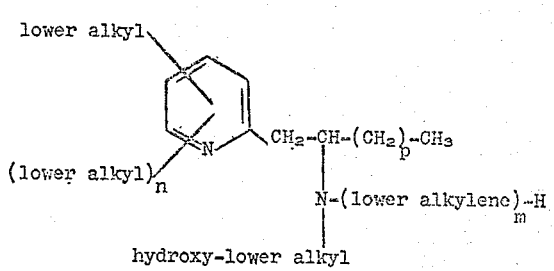

wherein $n$, $m$ and $p$ are each selected from the group consisting of 0 and 1.

6. A compound of the formula

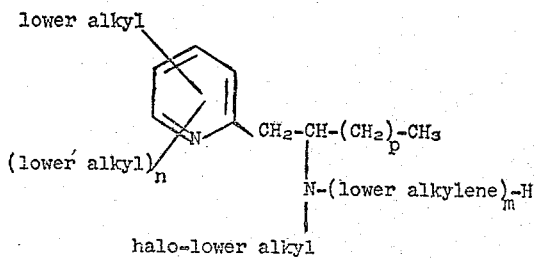

wherein $n$, $m$ and $p$ are each selected from the group consisting of 0 and 1.

7. 1-(5-methyl-2-pyridyl)-2-[N-methyl-N-(β-chloro-ethyl)-amino]-propane.
8. 1-(5-ethyl-2-pyridyl)-2-[N-methyl-N-(β-chloro-ethyl)-amino]-propane.
9. A compound of the formula

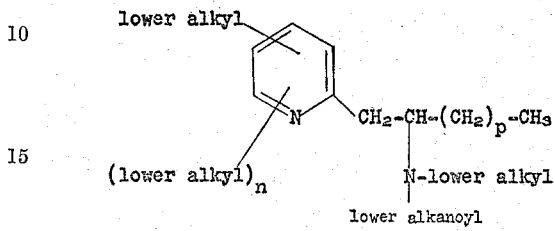

wherein $n$ and $p$ are selected from the group consisting of 0 and 1.

10. A method for the preparation of 2-pyridyl-alkyl-amines of the formula

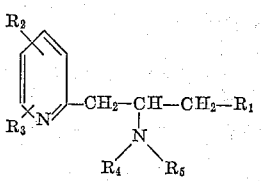

wherein $R_1$ is selected from the group consisting of hydrogen and methyl; $R_2$ is lower alkyl; $R_3$ is selected from the group consisting of hydrogen and lower alkyl; $R_4$ is selected from the group consisting of hydrogen, lower alkyl, ar-lower alkyl, halo-lower alkyl, and lower alkanoyl; and $R_5$ is selected from the group consisting of lower alkyl, ar-lower alkyl, hydroxyl-lower alkyl, and halo-lower alkyl;

which comprises reductively aminating a ketone of the formula

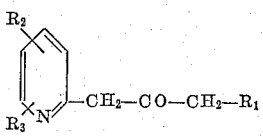

wherein $R_1$, $R_2$, and $R_3$ have the same meaning as above;

with an amino compound of the formula

wherein $R_4'$ is selected from the group consisting of hydrogen, lower alkyl, and ar-lower alkyl, and $R_5'$ is selected from the group consisting of hydrogen, lower alkyl, ar-lower alkyl and hydroxy-lower alkyl.

11. A method according to claim 10 in which the reductive amination is conducted by means of hydrogen in the presence of an hydrogenation catalyst.

12. A method according to claim 11 in which the hydrogenation catalyst is Raney nickel.

13. A method according to claim 10 in which $R_4'$ and $R_5'$ are both hydrogen and the so-obtained primary amine is converted into a secondary amine via the introduction on the aliphatic nitrogen atom of a substituent selected from the group consisting of lower alkyl, ar-lower alkyl, hydroxy-lower alkyl, and halo-lower alkyl.

14. A method according to claim 10 in which one of $R_4'$ and $R_5'$ is hydrogen and the so-obtained secondary amine is converted into a tertiary amine via the introduction on the aliphatic nitrogen atom of a substituent selected from the group consisting of lower alkyl, ar-lower alkyl, hydroxy-lower alkyl, and halo-lower alkyl.

15. A process as in claim 13, in which the so-obtained secondary amine is converted into a tertiary amine via the introduction on the aliphatic nitrogen atom of a substituent selected from the group consisting of lower alkyl, ar-lower alkyl, hydroxy-lower alkyl and halo-lower alkyl.

References Cited in the file of this patent

UNITED STATES PATENTS

| 2,604,473 | Sperber et al. | July 22, 1952 |
| 2,684,965 | Weston et al. | July 27, 1954 |
| 2,792,403 | Blicke | May 14, 1957 |
| 3,055,906 | Shapiro et al. | Sept. 25, 1962 |

OTHER REFERENCES

Walter et al.: J.A.C.S., vol. 63, pp. 2771–3 (1941).

UNITED STATES PATENT OFFICE
CERTIFICATE OF CORRECTION

Patent No. 3,133,077                                             May 12, 1964

Andor Fürst et al.

It is hereby certified that error appears in the above numbered patent requiring correction and that the said Letters Patent should read as corrected below.

Column 1, lines 15 to 22, for that portion of the formula reading:

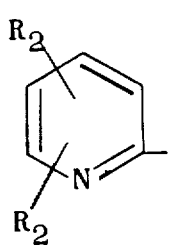      read      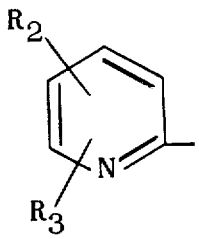

column 2, line 55, for "formly" read -- formyl --.

Signed and sealed this 27th day of October 1964.

(SEAL)
Attest:

ERNEST W. SWIDER                                 EDWARD J. BRENNER
Attesting Officer                                 Commissioner of Patents